United States Patent [19]

Ikeya

[11] Patent Number: 4,602,330
[45] Date of Patent: Jul. 22, 1986

[54] DATA PROCESSOR

[75] Inventor: Fumihiro Ikeya, Kashiwa, Japan

[73] Assignee: Panafacom Limited, Kawasaki, Japan

[21] Appl. No.: 685,613

[22] Filed: Dec. 28, 1984

Related U.S. Application Data

[63] Continuation of Ser. No. 617,849, Jun. 8, 1984, abandoned, which is a continuation of Ser. No. 315,878, Oct. 28, 1981, abandoned, which is a continuation of Ser. No. 165,045, Jul. 1, 1980, abandoned, which is a continuation of Ser. No. 954,530, Oct. 25, 1978, abandoned.

[30] Foreign Application Priority Data

Oct. 1, 1977 [JP] Japan .............. 52-131365

[51] Int. Cl.$^4$ .............................................. G06F 13/00
[52] U.S. Cl. .................................................... 364/200
[58] Field of Search ................................ 364/200, 900

[56] References Cited

U.S. PATENT DOCUMENTS

| | | |
|---|---|---|
| 3,461,433 | 8/1969 | Emerson ........................ 364/200 |
| 3,614,741 | 10/1971 | McFarland, Jr. et al. ......... 364/200 |
| 3,699,528 | 10/1972 | Carlson et al. ................... 364/200 |
| 3,754,218 | 8/1973 | Hatta et al. ...................... 364/200 |
| 3,938,096 | 2/1976 | Brown et al. .................... 364/200 |
| 3,949,378 | 4/1976 | Crabb et al. ..................... 364/200 |
| 4,047,247 | 9/1977 | Stanley et al. ................... 364/200 |
| 4,057,850 | 11/1977 | Kaneda et al. ................... 364/200 |
| 4,068,300 | 1/1978 | Bachman .......................... 364/200 |
| 4,079,451 | 3/1978 | Woods et al. .................... 364/200 |
| 4,109,310 | 8/1978 | England et al. .................. 364/200 |

*Primary Examiner*—Gary Chin
*Attorney, Agent, or Firm*—Staas & Halsey

[57] ABSTRACT

In a data processor for handling data comprising words of n-bits, a plurality of (n+m)-bit registers is provided for use as general purpose and address expansion registers, and effective addresss of (n+m)-bits are generated by adding addresses having n bits and provided in the instructions with the (n+m)-bit content of registers designated by the instructions. Thus, a data processor can be designed so as to have an expandable address bit length and flexible addressing with little additional hardware.

8 Claims, 5 Drawing Figures

DATA PROCESSOR

This is a continuation of application Ser. No. 617,849 filed on June 8, 1984, abandoned, which is a continuation of application Ser. No. 315,878, filed on Oct. 28, 1981, abandoned, which is a continuation of application Ser. No. 165,045 filed on July 1, 1980, abandoned, which is a continuation of application Ser. No. 954,539 filed Oct. 25, 1975, abandoned.

BACKGROUND OF THE INVENTION

1. Field of the Invention

The present invention relates to a digital data processor which handles data comprising words of n-bits wherein address modification for generating (n+m)-bit addresses requires comparatively little hardware and has a high degree of freedom.

2. Description of the Prior Art

In a data processor for n-bit words (hereinafter referred to simply as a processor), and particularly for a value of n in the range from 8 to 32, an instruction is composed in general of 2 to 3 words, and the first word includes an operation code part and a register designation part, while the other words may each be used for designating the location of an operand. Therefore, the memory address is limited to n-bits, and the capacity of the memory unit is limited to $2^n$ words.

Presently, as a method of expanding a memory address to n+m bits in such a processor, the base register method and the bank method are well known.

In the base register method, a base register of n+m bits is provided for base address modification, and an (n+m)-bit address is obtained by adding the n-bit address given in an instruction with the content of said base register. In this method, memory word capacity can be used effectively since the base address can be selected freely, but on the other hand, it is not suited to a small size processor since a relatively large amount of hardware is required as will be described later. U.S. Pat. No. 3,949,378 discloses one example of the prior art base register method.

In the bank method, an m-bit bank designation register is provided, and an (n+m)-bit address is obtained by concatenating (connecting in series) the content of the bank designation register to the high order side of the n-bit address given in the instruction. In this method, memory word capacity cannot be used effectively since the boundaries of each memory area can be designated only in terms of every $2^n$ words, however, only a small amount of hardware is required for this concatenation.

The prior art base register method is explained in reference to FIG. 1, wherein, by way of example, and for the subsequent disclosure following, n=16 and m=3. The figure shows a 19-bit instruction counter 1 and a memory space 2 of $2^{19}$=512K words. In the address 7, designated by the content of the instruction counter 1, the 1st word of a 2-word instruction is stored, and in the adjacent address the 16 bit content of the 2nd word of the same instruction is stored. The effective operand address 6 is obtained by simultaneously adding with a three input adder (1) the 16-bit content 3 of the 2nd word of the instruction, (2) the 16-bit content 4 of the general purpose register designated by the register designation part in the 1st word, and (3) the 19-bit content 5 of the base address register. Said general purpose register is used as the index register.

The meaning of index modification and base address modification is now explained. When plural programs run on one processor on a time sharing basis, the base address indicates the heating address of the memory area in which each program can be used. When a certain program runs, the base address for such a program is placed in the base address register by the control program. In general, the memory area used in each program is a maximum of 64K(=$2^{16}$) words, but more areas can also be used if provided for at the time of program generation. When the same sub-routine or list information is used in different parts of a program, an effective address for desired data in the relevant sub-routine or list information can be defined by adding the relative address in the sub-routine or list with the heading address of the relevant sub-routine or list information. In this case, the heading address of the sub-routine is indicated by an index and stored in the index registers. The index registers are generally used also as general purpose registers. In case a plurality of sub-routines or list information is used in one program, it is desirable to prepare all of the heading addresses for the index registers. Because it takes longer to load these heading addresses from the memory each time required, many index registers are required. Since the base address does not change while one program runs, one or two base addresses are sufficient in general.

Although it is possible to perform the index modification and base modification separately by using a 2-input adder, it is not practical because a longer time is taken. Thus a 3-input adder is generally used.

As explained above, the base register method requires a 3-input adder for practical operation and much hardware is required, so that the method is not suited to a small size processor.

The bank method is now explained in reference to FIG. 2, showing a 19-bit instruction counter 11 and a 512K word memory space 12. The 19-bit effective address 16 is obtained with the two input adder by adding (1) the content (the 2nd word of the instruction) of the address next to address 17 with (2) the index register 14 indicated by the register designation part in the 1st word, and by concatenating the content of the 3-bit bank designation register 15 to the upper bit of the sum. In this method, a 2-bit adder can be used and little hardware is required for this concentration, but on the other hand, there are disadvantages.

Here, each area of $2^{16}$=64K words is called a bank. As described in the explanation of the base register method, when assigning areas within 64K words to be used for each program, it is inevitable to assign one bank to each program. Even if a certain program requires a memory area of less than 64K words, the remaining area becomes useless because it is difficult to make the other program use the remaining area of the assigned bank.

SUMMARY OF THE INVENTION

It is an object of the present invention to realize address modification for designating an increased-bit base address without increasing the amount of hardware.

It is another object of the present invention to realize address modification as in the existing base register methods without increasing the amount of hardware.

In order to achieve these purposes by the present invention, plural registers are provided with (n+m)-bit capacity for use as expanded index registers and general purpose registers, and index modification and base address modification are conducted by a single modification operation.

By conducting the index and base address modification operations with a single operation, the requisite hardware for this address modification can be reduced. Flexibility of addressing is not limited in the multiple application of expanded index registers, and additional hardware is not required in using these index registers also for the general purpose registers. The configuration and workings of this invention are illustrated generally by the embodiments described below in reference to the drawings.

DESCRIPTION OF THE PREFERRED EMBODIMENTS

Figure 1:
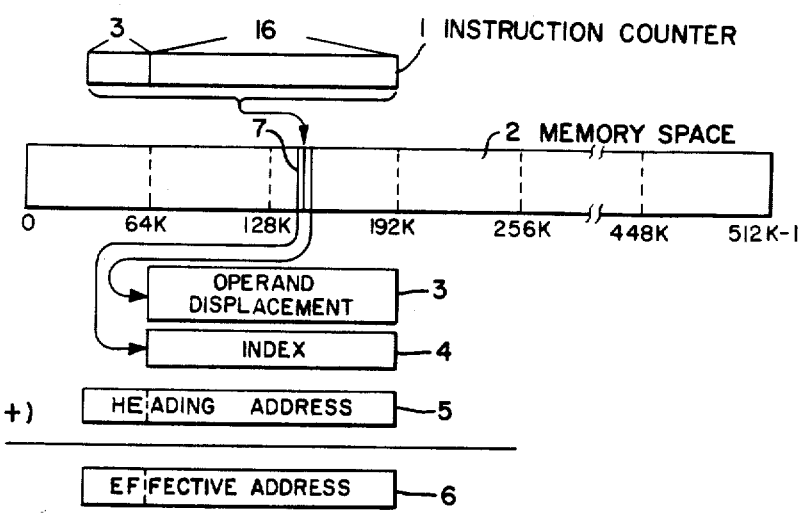
FIG. 1 demonstrates schematically the prior art base register method of address expansion.
Figure 2:
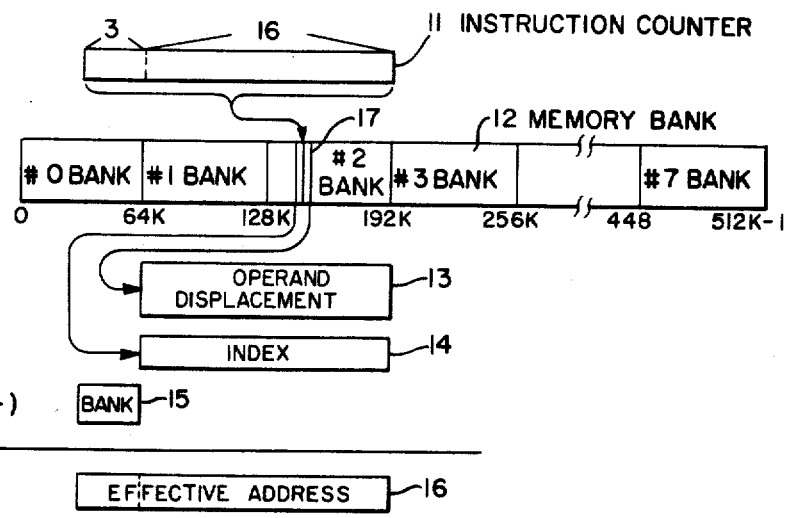
FIG. 2 demonstrates schematically the prior art bank method of address expansion.
Figure 3:
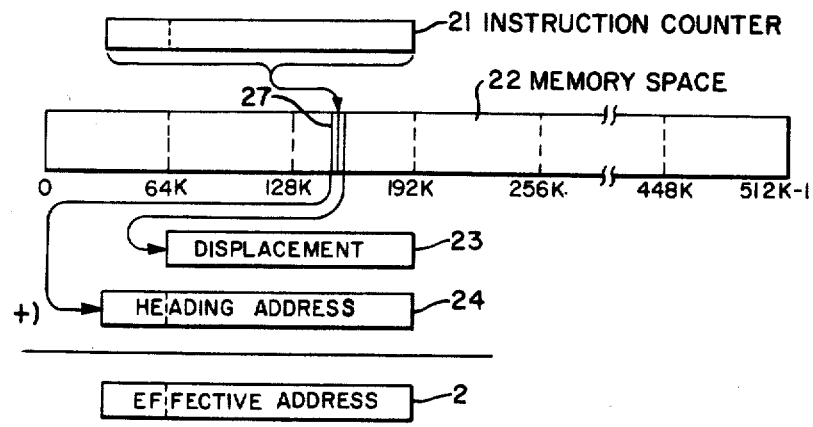
FIG. 3 demonstrates schematically one embodiment of address modification according to the present invention.

The address modification operation of the present invention is explained by reference to FIG. 3, showing a 19-bit instruction counter 21 and a 512K word memory space 22. The 19-bit effective address 26 can be obtained simply by adding with a two input adder (1) the content (2nd word of the instruction) of the address adjacent to address 27 indicated by the instruction counter with (2) the 19-bit content of the expanded index (index plus base) register 24 designated by the register designation part of the 1st word. Since a 3-input adder is not required, the hardware can be reduced, and since each index register is expanded up to 19 bits, it can also be used for the base address modification function. Namely, in each expanded index register of the present invention, a value is obtained by adding in advance the conventional index address and the conventional base address, the sum being the corresponding heading address, that is, the expanded index address. This addition should be done early in the program step, and since many index registers are available and can be used also for the general purpose registers, each value once obtained by addition can be stored. Therefore, there is little problem when the same index is used many times.

Figure 4:
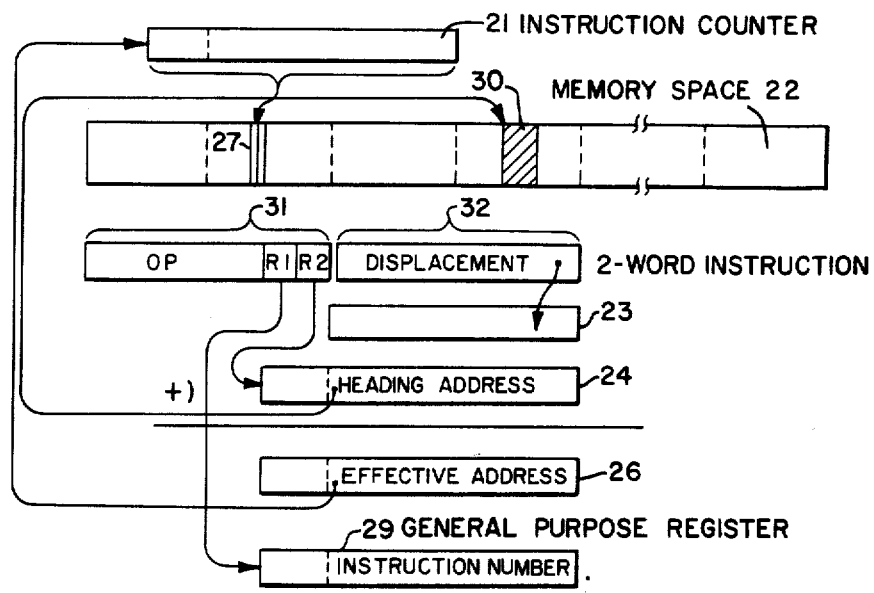
FIG. 4 demonstrates one example of the sub-routine link instruction according to the present invention.

An example of operating the sub-routine link instruction in the present invention is explained in reference to FIG. 4, where the reference characters 21 to 27 correspond to the same elements as those in FIG. 3. The first 16 bit word 31 of a 32-bit instruction is stored in address 27, designated by the value in the instruction counter 21, and comprises the operation code OP and register designation parts R1 and R2. The 2nd word 32 of the instruction is the displacement of the operand address, which is stored in the address 28 adjacent to address 27. When a sub-routine link instruction is detected as a result of decoding the operating code in the first word 27 of the instruction, the value in the instruction counter 21 may be saved in the general purpose register 29 as designated, for example, by the register designation part R1 (2 may be added to the initial value for designating a next instruction, for example). In parallel with such operation, the 2nd word is added to the content (the heading address of the sub-routine) of the general purpose register (the register containing the sum of the index and base headings) which is designated by the register designation part R2. Then, the result of the addition is placed in the instruction counter 21. As a result, the instruction on data information in the sub-routine 30 is read out from the memory by the next read-out operation. Then, the instruction number saved in the general purpose register 29 is moved again to the instruction counter 21 when processing under the sub-routine 30 has come to an end. Thus, the initial program can be executed continuously.

Figure 5:
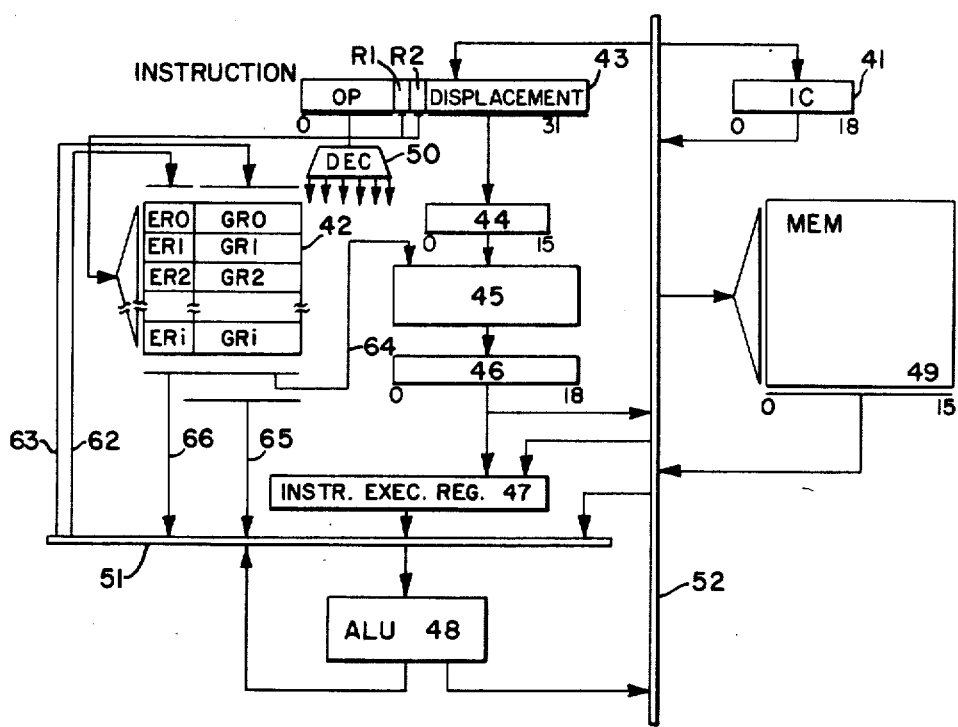
FIG. 5 shows a block diagram of one embodiment of the processor of the present invention.

A block diagram of an embodiment of the processor based on the present invention is now explained in reference to FIG. 5, which shows a 19-bit instruction counter 41, general purpose registers 42 respectively having 3-bit expanded portions ER0 to ERi and 16-bit basic parts GR0 to GRi, a 32-bit instruction register 43, a 16-bit register 44 for storing displacement, a 2-input adder 45 for address calculation, a 19-bit address register 46 for holding the effective address, an instruction execution register 47 in which data to be processed in a logic and arithmetic component ALU48 are temporarily held, a memory 49, an instruction decoder 50, a 16-bit internal data bus 51, and an external bus 52 comprising a 16-bit data bus and a 19-bit address bus.

In the instruction counter 41, an increment is automatically added each time one instruction is read out from the memory. An instruction which requires memory access for obtaining the operand is generally a 2-word instruction and the displacement is stored in the 2nd word. Since only one word is necessary for an instruction which uses the data in the general purpose registers 42 as the operand, such an instruction is loaded in the upper 16 bits of the instruction register 43. When the instruction in the instruction register 43 is determined by means of the instruction decoder 50 to require memory access, the 19-bit content in the general purpose register designated by the register destination part R2 is added via the line 64 to the 16-bit content of the register 44 by the adder 45 and used as the effective address. Then, it is put into the address register 46 in order to allow access to the memory 49. The 16-bit data from the memory 49 is sent to the register 47 via the bus 52 and then input to ALU48. Simultaneously, the 16-bit basic part of the general purpose register 42 designated by the register designation part R1 may be input to ALU48 via the line 65 to the bus 51, depending on the decoded operating instructions. The result of the operation may be for example, stored in the basic port of the general purpose register designated by R1 via the bus 51 and line 63.

Generally in data operations, the read/write operation is conducted only with the 16-bit basic parts GR0 and GRi of the general purpose registers 42, while the address calculation 1 and the read operation is conducted simultaneously using both the basic parts GR0 and GRi and the expanded parts ER0 and ERi (i.e., the full 19 bits). These operations are controlled by the output of the decoder 50.

The operation of writing into the expanded parts ER0 to ERi of the general purpose registers 42 is now explained. The aforementioned 19-bit base address is stored in a 2-word area of an address in the memory. The data in these two words are read out to the instruction execution register 47, and directly or after addition with the desired 16-bit index address, are written by ALU48 into one of the general purpose registers 42. In this case, the lower 16 bits are first writtenvia the bus 51 and line 63 and then the upper three bits are written via the lower three bits of bus 51 and line 62. The bus 51 has a 16-bit width. It is desirable that ALU48 should have a 19-bit width.

However, if the memory area assigned to one program is considerably smaller than 64K words, and therefore assignment of the entire area covering the 64K-word boundary is unnecessary, the ALU48 may have a 16-bit width, because no overflow due to addition of the 16-bit index and the lower 16 bits of the base address will be generated.

The incremental value (+1 or +2, as mentioned above) is not always added to the contents of the instruction counter 41, since it may also be loaded with the 19-bit value from the general purpose register 42, or loaded by the output of ALU48 as described concerning FIG. 4.

The various controls mentioned above can easily be attained by using a control means utilizing a micro-program for the decoder 50.

As explained above, the present invention realizes a data processor in which a general purpose register is used as both a base register and an index register by being expanded up to n+m bits, and the same addressing function of the prior art base register method is achieved with relatively little hardware by using a 2-input adder for the address modification.

I claim:

1. A data processor for processing data in the form of n-bit words according to program instructions, each said instruction being constituted of a selected respective number of n-bit words, said processor being used in conjunction with an external memory for storing $2^{n+m}$ n-bit words, where n and m are integers, said memory generally storing plural programs, each program and-/or sub-routine executing only within its allocated $2^n$ memory space and being less than or equal to $2^n$ words in length, said processor comprising:

a plurality of n+m bit general purpose registers, each having an n bit portion and an m bit extension portion, said extension portion used only for addressing, each of said general purpose registers acting as both an operand data handling register and as a combined base and index register and suitable for storing one of said n-bit data words used as the operand data, or as an address expansion register for storing a respective predetermined (n+m)-bit heading address used as the base and index address for one of the programs stored in said memory, each said heading address of each said program being the sum of an (n+m)-bit base address and an n-bit index address; and a single 2-input adder, operatively connected to said general purpose registers, for determining a (n+m)-bit effective address, for accessing said memory according to the instructions of the selected program, each said instruction for accessing said memory including a register designation part in one word of the instruction and an n-bit displacement in another word of the instruction, by adding said n-bit displacement with the (n+m)-bit content of the designated general purpose register.

2. The processor of claim 1, further comprising an n-bit internal data bus and means for selectively providing to said n-bit internal data bus the n-bit data of each general purpose register when used as a general purpose register, and for selectively providing to said internal data bus from said general purpose registers when used as address expansion registers, in sequence, n of said (n+m) bits and the remaining m of said (n+m) bits.

3. The data processor of claim 2, further comprising linking means for making a link from an initial routine of the selected program to a selected sub-routine identified by said instructions of the program, and for subsequently returning to said initial routine, said linking means comprising means for utilizing said external memory of (n+m)-bit capacity for storing said initial and sub-routines according to said effective address, and each said program storing the respective base and index addresses for computing said heading address stored in said general purpose registers.

4. The processor of claim 1 or 2, said processor being connected to said external memory and to an instruction counter by an external bus having an n-bit data channel and an (n+m)-bit address channel, said processor further comprising:

an instruction register for receiving the instruction from said memory that is designated by said instruction counter;

a decoder for decoding the operation code of each said instruction; and an arithmetic-logic unit for conducting arithmetic and logic operations for said processor in accordance with said instruction.

5. A method for using in a data processor a single 2-input adder for determining effective (n+m)-bit addresses for n-bit words for selective storage in and recall from an external memory during the operation of a program stored in said memory, said program and/or sub-routine being less than $2^n$ words in length, said memory having a capacity of $2^{n+m}$ of said words where n and m are integers, said method comprising the steps of:

providing said processor with means for operating under the control of the instruction of each said program, each said instruction consisting of a predetermined number of said n-bit words;

further providing said processor with a plurality of n+m-bit registers, each having an n bit portion and an m bit extension portion, said extension portion only used for addressing, and each of said registers for selective use as n-bit general purpose register and an (n+m)-bit address register;

adding in said single adder, to form the heading addresses at the beginning of processing each said program, the base and index values for accessing the sub-routines of the program, and storing each said heading address in a respective extendable register; and adding in said single adder an n-bit displacement from an operand, provided by an instruction being processed, with the contents of one of said extendable registers designated by the same instruction to obtain each said effective address for accessing said memory according to the instructions of the program being processed.

6. The method of claim 5 further comprising utilizing only the first n-bits of said registers when utilized as said general purpose registers.

7. A data processor for use with an external memory having (n+m)-bit addresses for storing $2^{n+m}$ words of n-bits each, an (n+m)-bit external bus connected to said external memory comprising an n-bit data bus and an (n+m)-bit address bus, an (n+m)-bit instruction counter connected to said external bus for counting instructions to be read out from said memory, where n and m are integers, said data processor executing routines and/or sub-routines less than or equal to $2^n$ words in length and comprising:

an instruction register of at least 2n-bits connected to said external bus and for receiving said instructions from said memory;

a decoder, connected to said instruction register, for reading an operation code designated within one word of each instruction in said instruction register;

an n-bit register, connected to said instruction register, for reading the n-bit displacement of an operand selectively provided in at least a second word of said instruction in said instruction register;

a plurality of n+m-bit general purpose registers, each having an n bit portion and an m bit extension portion, said extension portion used only for addressing, each of said general purpose registers for use as a general purpose operand data handling register and an address expansion register for storing sub-routine heading addresses, said plurality of general purpose registers being connected to said instruction register, so that particular ones of said general purpose registers are selectively designated by register designation parts of the first word of an instruction in said instruction register;

a single 2-input (n+m)-bit adder, connected to said n-bit register and to said plurality of general purpose registers, for adding the content of a designated one of said general purpose registers with the n-bit displacement stored in said n-bit register to form a respective effective address for accessing said memory;

an (n+m)-bit address register connected to said adder to receive said effective address, the output of said (n+m)-bit address register being connected to said external bus;

an instruction execution register connected to said external bus and to said output of said (n+m)-bit address register, said instruction execution register being connected to receive and hold the operand from the effective address of said external memory designated by the sum contained in said (n+m)-bit address register;

an n-bit internal data bus connected to said plurality of (n+m)-bit general purpose registers, to said instruction execution register, and to said external bus; and an arithmetic-logic unit, connected to said internal and external buses and to said instruction execution register, for operating on the contents of said instruction execution register according to said operand code of the instruction in said instruction register.

8. A method of executing programs and generating a m-bit effective address for addressing a memory of $2^m$ words using an n-bit displacement from an instruction, an n-bit index address, an m-bit base address, an m-bit general purpose register, having an n-bit portion and an extension portion of m−n bits, said extension portion only used for addressing, and a single m-bit adder, where n and m are integers and m is greater than n, each program and/or sub-program executing only within an allocated $2^n$ word memory space and being less than or equal to $2^n$ words in length, said method comprising the steps of:

adding in said single adder a combined base and index address as a single value for each program;

storing the combined base and index address in the general purpose register;

adding the combined base and index address stored in the general purpose register to the n-bit displacement via said single m-bit adder to form the m-bit effective address during execution of said program and/or sub-program; and accessing only within the allocated memory space in dependence upon the m-bit effective address to execute the instructions.

* * * * *

UNITED STATES PATENT AND TRADEMARK OFFICE
CERTIFICATE OF CORRECTION

PATENT NO. : 4,602,330

DATED : July 22, 1986

INVENTOR(S) : FUMIHIRO IKEYA

It is certified that error appears in the above-identified patent and that said Letters Patent is hereby corrected as shown below:

Front page, [30], line 2, "Oct." should be --Nov.--.

Col. 1, line 10, "1975" should be --1978--.

Col. 4, line 51, "port" should be --part--.

Signed and Sealed this

Twenty-eighth Day of October, 1986

[SEAL]

Attest:

DONALD J. QUIGG

*Attesting Officer*   *Commissioner of Patents and Trademarks*